W. D. HAMER.
RAIL BOND.
APPLICATION FILED AUG. 9, 1915.
1,281,561.
Patented Oct. 15, 1918.
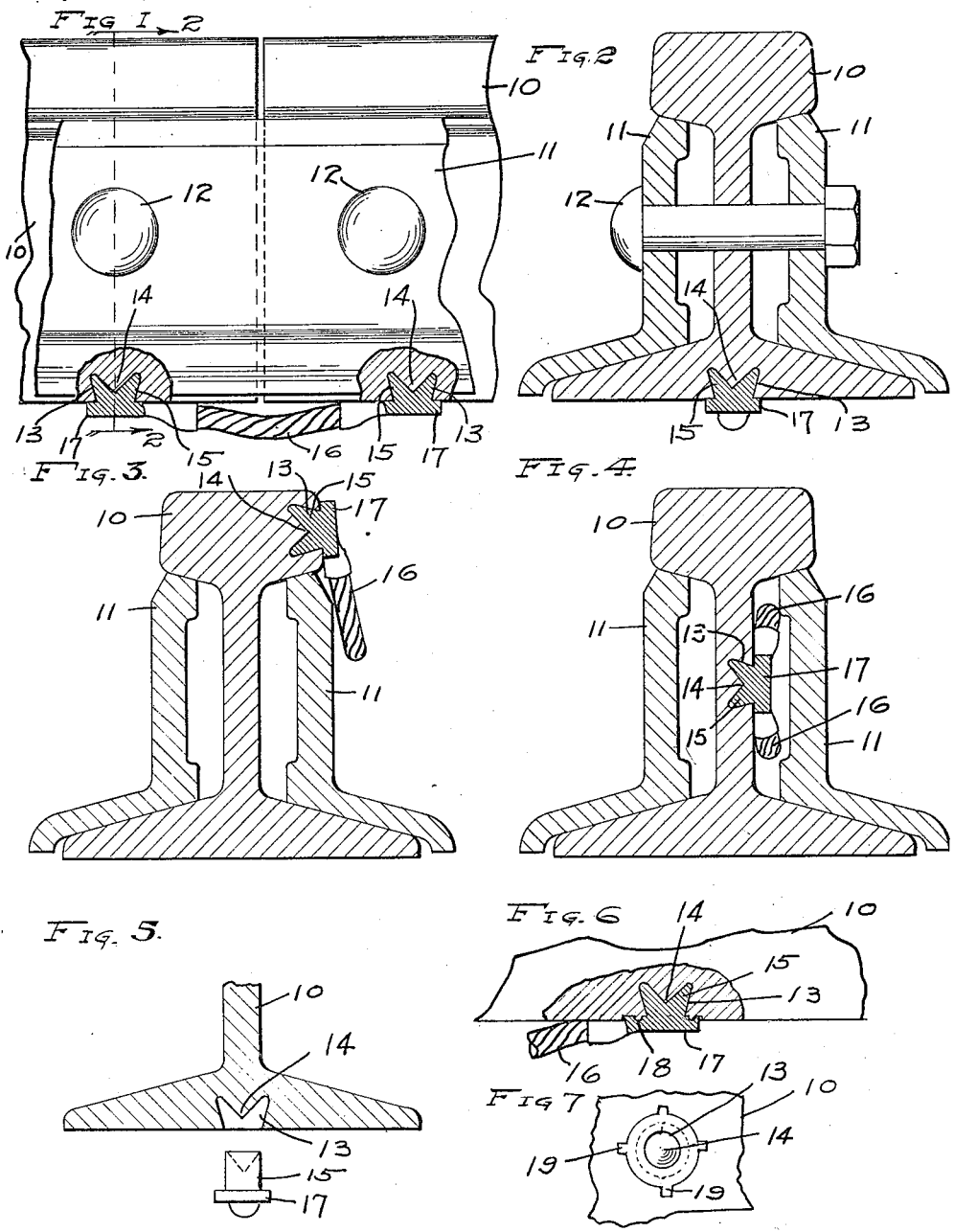
WITNESSES:
INVENTOR
William D. Hamer.
BY
ATTORNEY

UNITED STATES PATENT OFFICE.

WILLIAM D. HAMER, OF INDIANAPOLIS, INDIANA.

RAIL-BOND.

1,281,561.  Specification of Letters Patent.  Patented Oct. 15, 1918.

Application filed August 9, 1915. Serial No. 44,619.

*To all whom it may concern:*

Be it known that I, WILLIAM D. HAMER, a citizen of the United States, and a resident of Indianapolis, county of Marion, and State of Indiana, have invented a certain new and useful Rail-Bond; and I do hereby declare that the following is a full, clear, and exact description thereof, reference being had to the accompanying drawings, in which like letters refer to like parts.

This invention relates to a rail bond which is adapted to be hammered or forced into a hole having a peculiar drill, namely, a hole having a larger bottom diameter than top, or outwardly flaring, and having an outwardly extending cone shaped bottom, so that the copper or metal is forced against said cone and flows uniformly and simultaneously outward toward the wall of the hole under the hammer blows or force, thereby making an inter-cone shaped mass. The bond terminal is made cone shape and approximately to the shape of the cone inside the hole. The hole, having a larger diameter at the bottom than at the top and the copper being forced to spread by the cone bottom, it will fill the hole from the bottom out, thereby forcing out the air as it fills the hole. This feature is very important, as most rail bonds leave air spaces between the contact surfaces, thereby lessening them.

Another feature and advantage of this bond results from the elimination of the possibility of the metal in the bond rebounding under a blow or pressure, thereby spacing itself away from the contact surfaces. This one assures a perfect contact of the copper with the sides of the cone and the wall of the hole. This gradual and complete filling of the hole from the bottom out by means of the spreading of the copper on the cone, eliminates any expansion of copper above the hole before it is completely filled.

Another feature of the invention is that the bond, being expanded in a hole whose bottom is larger than its top diameter, is greatly strengthened due to the increased diameter of the metal in the bottom of the hole.

Still another feature of this invention is that the contact area is greater and makes the bond more efficient because of the hole being larger at the bottom and having a cone surface instead of a flat surface.

There may also be a bead around the hole which cuts its way into the surface of the head of the bond, thereby increasing the contact area of the bond hole still more and protecting the bond terminal from rust and corrosion as moisture cannot pass to attack the terminal. This may also be accomplished by leaving a groove around the hole so that the copper will be forced to flow therein.

The full nature of the invention will be understood from the accompanying drawings and the following description and claims.

In the drawings, Figure 1 is a side elevation of rails with portions thereof cut away showing the bonds in cross section. Fig. 2 is a cross section through the line 2—2 of Fig. 1. Fig. 3 is a modified view, showing the bond in the head of a rail. Fig. 4 is a modified view, showing the bond in a rail web. Fig. 5 is a view, showing the bond about to be driven into the hole. Fig. 6 is a vertical cross section through the bond showing a bead thereon. Fig. 7 is a view of the bond receiving hole provided with recesses about its periphery.

In the drawings there are rails 10 having fish plates 11 and bolts 12. There is a hole 13 drilled into that portion of the rail in which it is desired to connect the rail bond by a specially constructed tool, whereby it is under-cut so that it has a larger diameter at the bottom than at the top, thereby providing a flare. The hole 13 is cut away so that there is an outwardly extending cone-shaped bottom 14 which has a sharp point and tapers gradually out to the bottom and sides of the hole.

There is a stud 15 made of copper or other suitable conducting material and shaped approximately to fit the inside of the hole, as shown in Fig. 5. The bonds are connected by the conducting cables 16 which are connected to the heads of the studs 17. When the copper is hammered or forced into the hole, it first comes in contact with the pointed portion of the cone shaped member 14 where it is deflected and forced laterally against the side walls of the hole. This lateral deflection continues until the copper gradually fills up, having been forced with great pressure against the sides of the hole. This process continues until the hole is completely filled. Because of the shape of the hole, it is filled from the bottom up, forcing the air outward so that there are no air spaces left between the contact surfaces.

Because of the lateral outward force due to the cone shaped member, more pressure is exerted by the copper against the side walls, thereby making a closer and more secure contact. Rebounding of the metal is prevented because of the lateral pressure. This occurs in most rail bonds, because of the metal rebounding after it has hit the bottom, and leaving a space therein. In this invention the metal will not bulge outwardly around the top of the hole, as it is often caused to do in other rail bonds, until the hole is completely filled, as at no time does it strike a flat bottom.

It is also provided with a bead 18 cut around the outer surface of the hole so as to cut into the head 17 of the stud to prevent moisture from entering and corroding the surfaces. This may also be accomplished in other ways, such as cutting a groove around the outer surface of the hole and allowing the copper head to be sunk therein.

There is provided around the circumference of the hole recesses 19, as shown in Fig. 7, so that when the bond terminal is driven into said hole, the copper will flow into the seat of said recesses, thereby holding the terminal firmly and preventing its being loosened by means of turning in the hole.

The invention claimed is:

A rail having a hole therein, an outwardly extending cone-shaped bottom in said hole, outwardly flaring sides having a larger periphery at the bottom than at the top, a stud having a head thereon, and a bead around said hole adapted to wedge into said head for preventing moisture from reaching said stud when it is driven in said hole.

In witness whereof, I have hereunto affixed my signature in the presence of the witnesses herein named.

WILLIAM D. HAMER.

Witnesses:
J. H. WELLS,
R. G. LOCKWOOD.

Copies of this patent may be obtained for five cents each, by addressing the "Commissioner of Patents, Washington, D. C."